United States Patent
Sato et al.

(10) Patent No.: US 6,720,100 B2
(45) Date of Patent: Apr. 13, 2004

(54) CATALYST FOR OXIDATION OF GASEOUS COMPOUND

(75) Inventors: Kazunori Sato, Nagaoka (JP); Takashi Wakabayashi, Nagaoka (JP); Manabu Takezawa, Nagaoka (JP); Yasunobu Inoue, Nagaoka (JP); Shigeaki Suganuma, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 79 days.

(21) Appl. No.: 10/149,399

(22) PCT Filed: Oct. 26, 2001

(86) PCT No.: PCT/JP01/09454

§ 371 (c)(1),
(2), (4) Date: Jun. 11, 2002

(87) PCT Pub. No.: WO02/35621

PCT Pub. Date: May 2, 2002

(65) Prior Publication Data

US 2002/0183200 A1 Dec. 5, 2002

(30) Foreign Application Priority Data

Oct. 27, 2000 (JP) ......................................... 2000-328466

(51) Int. Cl.$^7$ .......................... H01M 8/10; H01M 4/86; H01M 4/92; H01M 4/96
(52) U.S. Cl. ............................. 429/30; 429/33; 429/44; 429/46
(58) Field of Search ............................... 502/327, 330, 502/332, 333, 334, 336, 338, 339, 346, 348, 527.12; 429/30, 44, 33, 46

(56) References Cited

U.S. PATENT DOCUMENTS

| | | | | |
|---|---|---|---|---|
| 3,862,023 A | * | 1/1975 | Johnson | 204/290 F |
| 4,173,518 A | * | 11/1979 | Yamada et al. | 204/67 |
| 4,384,986 A | * | 5/1983 | Lecloux et al. | 252/456 |
| 4,492,811 A | * | 1/1985 | Switzer | 136/255 |
| 6,379,830 B1 | * | 4/2002 | Sato et al. | 429/30 |

FOREIGN PATENT DOCUMENTS

| | | |
|---|---|---|
| EP | 270203 | 7/1987 |
| EP | 602864 A2 | 12/1993 |
| JP | A-47-33225 | 11/1972 |
| JP | 49-104873 | 10/1974 |
| JP | B-57-44374 | 9/1982 |
| JP | 2000-348736 | 12/2000 |

* cited by examiner

*Primary Examiner*—Cam N. Nguyen
(74) *Attorney, Agent, or Firm*—Paul & Paul

(57) ABSTRACT

A solid electrolyte fuel cell having an anode including an oxidation catalyst of a gaseous compound fine in size and superior in oxidation action able to eliminate pulverization work is provided. The oxidation catalyst is of a gaseous compound comprising a catalyst for promoting an oxidation reaction of a gaseous compound by oxygen ions supplied through a solid electrolyte under an environment where no oxygen molecules are present, comprising metal oxide particles produced by firing a precipitate comprised of a mixture of two types of metal hydrates obtained by coprecipitation from a mixed solution of two types of metal salts of different metal positive ions dissolved together, the composition of said metal oxide particles being expressed by the formula $ABO_2$ (where, A is one element selected from the group consisting of Pd, Pt, Cu, and Ag, B is one element selected from the group consisting of Co, Cr, Rh, Al, Ga, Fe, In, Sc, and Tl).

5 Claims, 8 Drawing Sheets

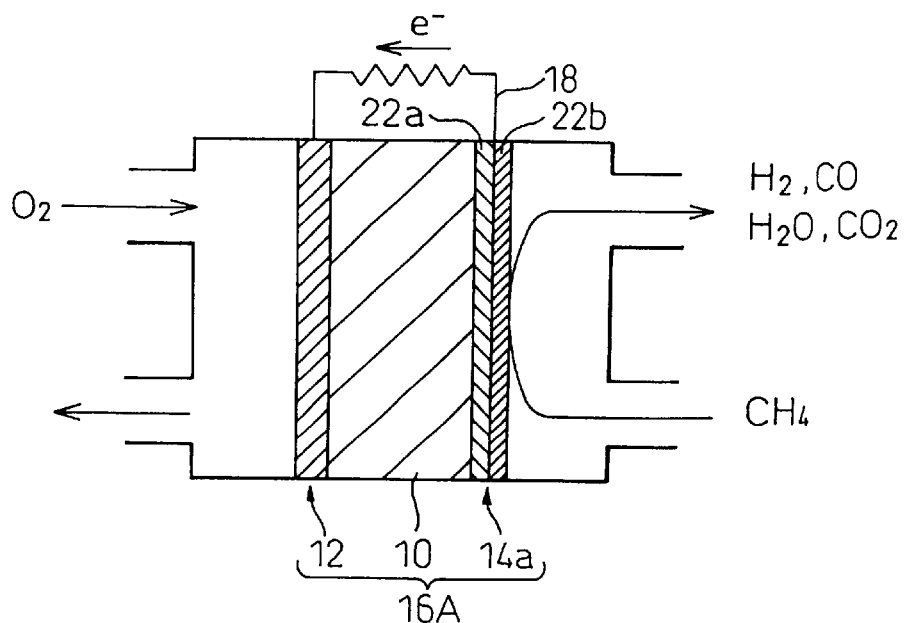
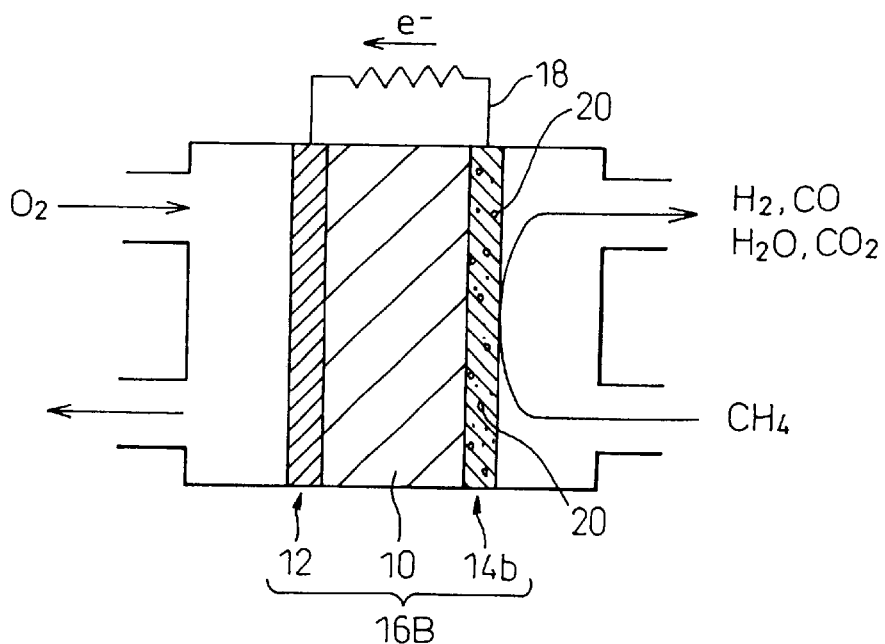

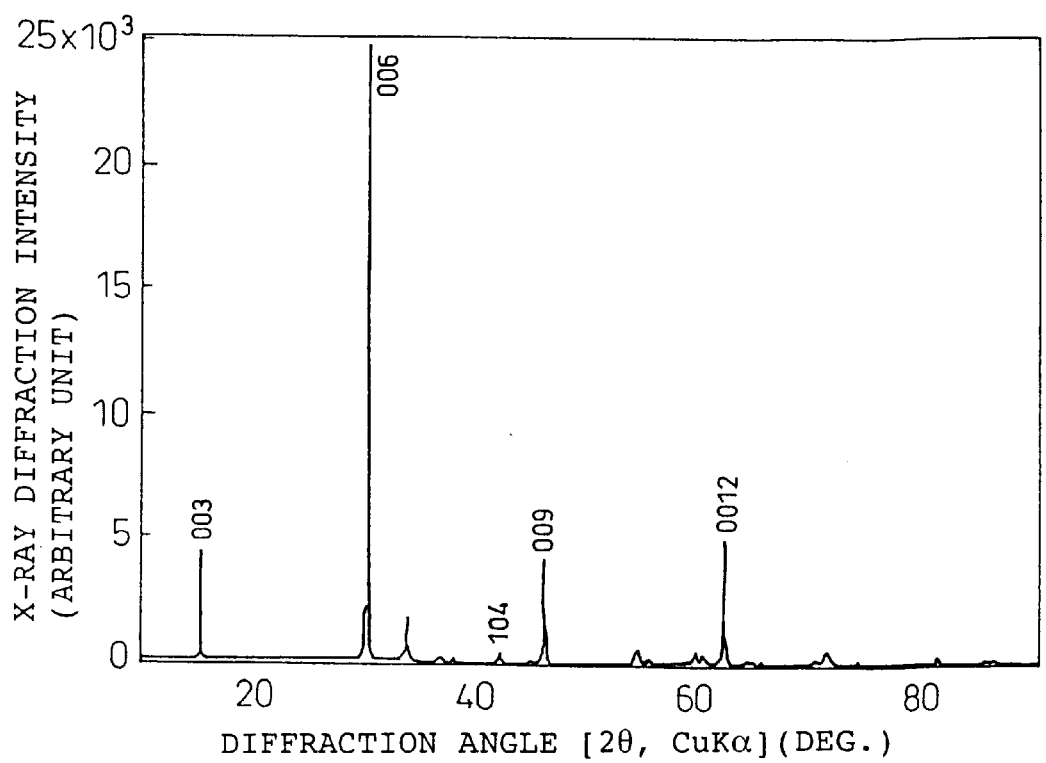

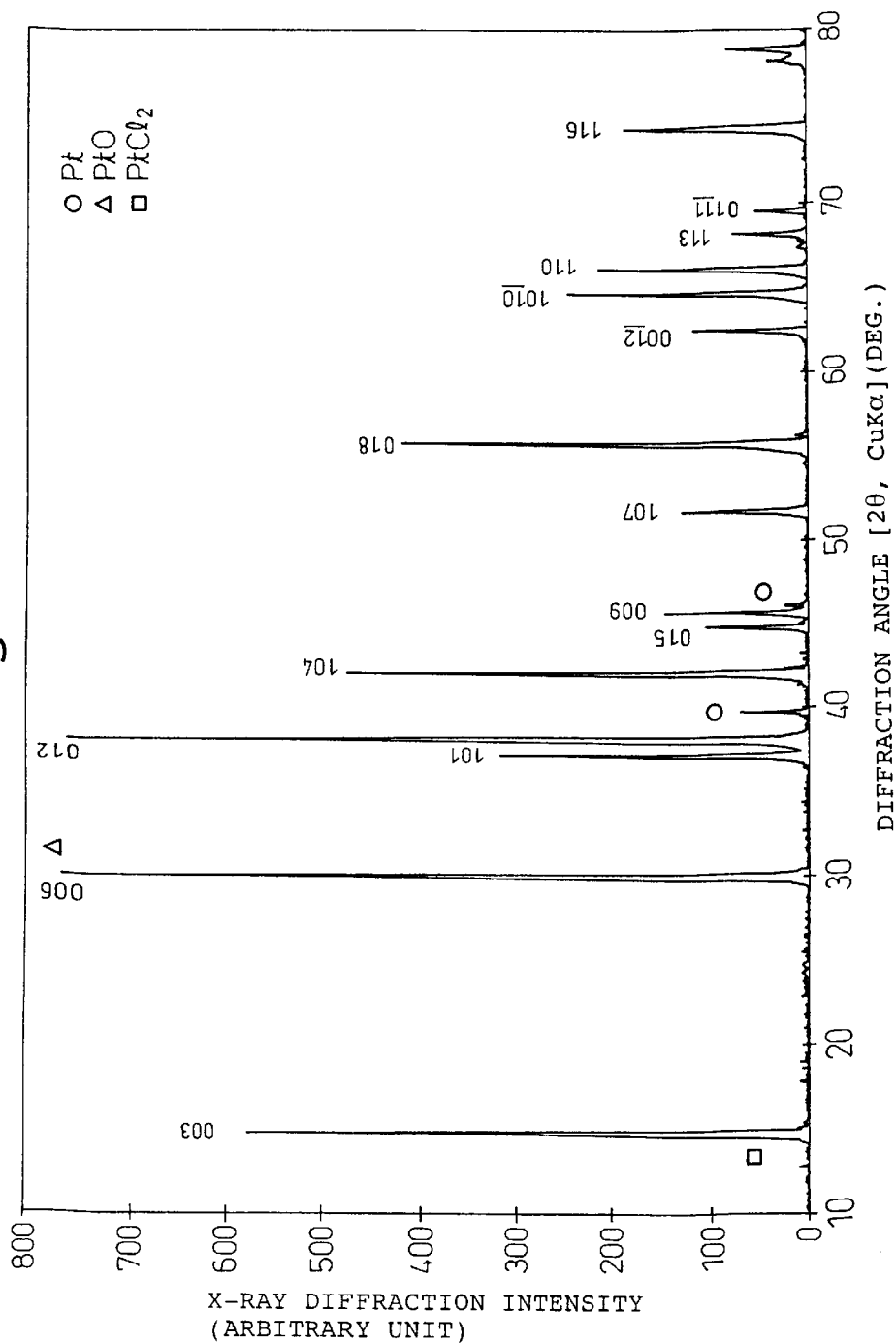

CATALYST FOR OXIDATION OF GASEOUS COMPOUND

TECHNICAL FIELD

The present invention relates to an oxidation catalyst of a gaseous compound, particularly a catalyst for promoting an oxidation reaction of a gaseous compound by oxygen ions supplied through a solid electrolyte under an environment where no oxygen molecules are present, more particularly relates to an oxidation catalyst of a gaseous compound which can be suitably used for a solid electrolyte fuel cell.

BACKGROUND ART

A solid electrolyte fuel cell can promise a higher efficiency of power generation compared with thermal power generation etc., so is being widely researched at the present.

The applicant proposed the solid electrolyte fuel cell shown in FIG. 1 in Japanese Unexamined Patent Publication (Kokai) No. 2000-348736.

The solid electrolyte fuel cell shown in FIG. 1 has a solid electrolyte element 16A comprised of an oxygen ion conducting type solid electrolyte substrate 10 and electrodes 12 and 14a formed on the two surfaces of this solid electrolyte substrate 10.

The solid electrolyte substrate 10 is comprised of a zirconia (YSZ) fired body stabilized by 8 mol % of yttria ($Y_2O_3$)

One electrode 12 is comprised of lanthanum strontium manganoxide [$(La_{0.8}Sr_{0.15})_{0.90}MnO_3$], is supplied with oxygen, and acts as a cathode.

The other electrode 14a is substantially comprised of a porous platinum layer, is supplied with methane gas as a fuel, and acts as an anode.

The oxygen ($O_2$) supplied to the cathode 12 is ionized at the interface between the cathode 12 and solid electrolyte substrate 10 and becomes oxygen ions ($O^{2-}$) which are conducted through the solid electrolyte substrate 10 to the anode 14a. These oxygen ions ($O^{2-}$) react with the methane ($CH_4$) gas supplied to the anode 14a to generate water ($H_2O$), carbon dioxide ($CO_2$), hydrogen ($H_2$), and carbon monoxide (CO). At the time of this reaction, electrons are emitted from the oxygen ions at the anode 14a, so a potential difference is caused between the cathode 12 and the anode 14a. If the cathode 12 and the anode 14a are electrically connected by an output line 18, the electrons of the anode 14a flow through the output line 18 in the direction of the cathode 12 (direction of arrow mark in figure) and electricity can be output from the solid electrolyte fuel cell.

The anode 14a is comprised of a porous platinum layer 22a formed on one surface of the solid electrolyte substrate 10 and an oxidation catalyst layer 22b formed on the outer surface carrying metal oxide particles comprised of $PdCoO_2$. The oxidation catalyst layer 22b promotes the oxidation reaction between the oxygen ions ($O^{2-}$) and methane at the anode 14a.

The solid electrolyte fuel cell shown in FIG. 1, by using the above oxidation catalyst, can improve the power generating characteristic compared with conventional solid electrolyte fuel cells using cermet particles comprised of nickel (Ni) and nickel oxide (Nio) as an oxidation catalyst.

In the solid electrolyte fuel cell shown in FIG. 1, the $PdCoO_2$ metal oxide particles used as the oxidation catalyst were ones obtained by double decomposition or high temperature pressure synthesis. To obtain the $PdCoO_2$, in double decomposition, $PdCl2$ and CoO are made to react for double decomposition under a high temperature and high pressure, while with high temperature pressure synthesis, PdO and CoO are sealed in a platinum tube and heated.

With each of these methods, the metal oxide particles obtained are large and uneven in size, so have been pulverized to make the particles finer and then sieved to obtain a uniform particle size. This is because the finer the metal oxide particles making up the oxidation catalyst, the higher the oxidation action obtained.

There are however the problems that there are limits to how fine the particles can be made by pulverization and that the cost of manufacture of the oxidation catalyst rises due to the need of the pulverization process.

DISCLOSURE OF INVENTION

The present invention has as its object the provision of an oxidation catalyst of a gaseous compound superior in oxidation action comprised of fine metal oxide particles.

To achieve the above object, the oxidation catalyst of a gaseous compound of the present invention comprises a catalyst for promoting an oxidation reaction of a gaseous compound by oxygen ions supplied through a solid electrolyte under an environment where no oxygen molecules are present, characterized by comprising metal oxide particles produced by firing a precipitate comprised of a mixture of two types of metal hydrates obtained by coprecipitation from a mixed solution of two types of metal salts of different metal positive ions dissolved together, the composition of the metal oxide particles being expressed by the formula:

$$ABO_2$$

where, A is one element selected from the group consisting of Pd, Pt, Cu, and Ag, B is one element selected from the group consisting of Co, Cr, Rh, Al, Ga, Fe, In, Sc, and Tl.

Typically, by firing a precipitate comprised of a mixture of $Pd(OH)_2$ and $Co(OH)_2$ obtained by coprecipitation from a mixed solution of $PdCl_2$ and $CoCl_2.6H_2O$ dissolved together, it is possible to obtain fine metal oxide particles comprised of $PdCoO_2$.

By the conventional double decomposition or high temperature pressure synthesis, depending on the mixed state or particle size of the starting material, there is an effect on the particle size of the metal oxide particles finally obtained and as a result an effect on the catalytic action of the oxidation catalyst.

The precipitate obtained by mixing two types of metal hydrates obtained by coprecipitation is comprised of fine particles of an even particle size, so the metal oxide particles obtained by firing the precipitate are also fine and uniform in particle size. By using the metal oxide particles as an oxidation catalyst, it is possible to obtain a high oxidation action.

BRIEF DESCRIPTION OF THE DRAWINGS

FIG. 1 is a sectional view of an embodiment of a solid electrolyte fuel cell suitable for application of the oxidation catalyst of the present invention.

FIG. 2 is a sectional view of another embodiment of a solid electrolyte fuel cell suitable for application of the oxidation catalyst of the present invention.

FIG. 3 is a chart of an X-ray diffraction pattern of metal oxide particles ($PdCoO_2$) obtained using coprecipitation according to the present invention.

FIG. 9 is a chart of an X-ray diffraction pattern of metal oxide particles ($PtCoO_2$) obtained using coprecipitation according to the present invention.

BEST MODE FOR CARRYING OUT THE INVENTION

Figure 4:
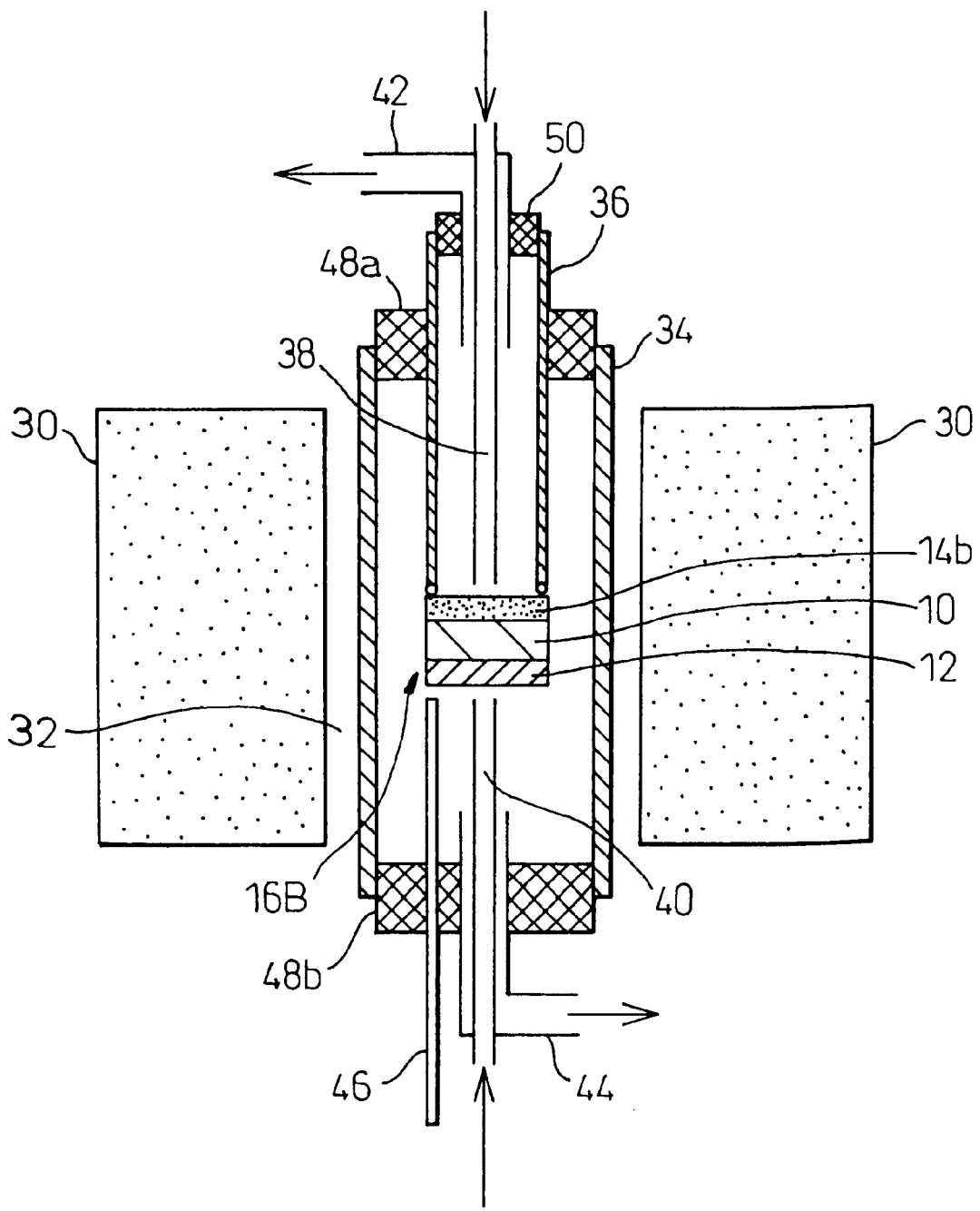
FIG. 4 is a sectional view of a measurement device for measuring the power generating characteristic of a solid electrolyte element.

The oxidation catalyst of the present invention, that is, the metal oxide particles, is obtained by firing a precipitate comprised of two types of metal hydrates obtained by coprecipitation from a mixed solution of two types of metal salts of different metal ions dissolved in each other.

As the metal salts, ones which can be dissolved in water or hot water are preferable. When difficult to dissolve, it is also possible to add some hydrochloric acid etc.

Sodium hydroxide etc. is added to the mixed solution containing the two types of metal salts to cause the two types of metal hydrates to coprecipitate, then the precipitate was obtained by filtration. The filtered precipitate was a mixture of the two types of metal hydrates.

The particles of the precipitate produced by coprecipitation from the solution are fine and uniform in size and not affected by the particle size of the metal salts forming the starting materials.

The filtered precipitate was dried, then fired. At the time of drying, secondary aggregation of the particles occurs, so after drying, it is preferable to simply pulverize the particles to an extent destroying the secondary aggregation, then fire them.

The firing is performed by filling and sealing the precipitate in a quartz glass tube or other sealed container and then heating. By this firing, only hydrogen is disassociated from the two types of metal hydrates to generate metal oxide particles comprised of the two types of metals bonded through oxygen.

These metal oxide particles have the composition of the following formula:

where, A is Pd, Pt, Cu., or Ag,
B is Co, Cr, Rh, Al, Ga, Fe, In, Sc, or Tl.

The metal oxide particles of the present invention are fine and uniform in particle size and have a high catalytic action for oxidation reactions of methane, carbon monoxide, and other gaseous compounds.

The oxidation catalyst of the present invention comprised of these metal oxide particles is a catalyst for promoting an oxidation reaction of a gaseous compound by oxygen ions supplied through a solid electrolyte under an environment where no oxygen molecules are present and typically can be used as an oxidation catalyst for a solid electrolyte fuel cell, in particular is suitable as an oxidation catalyst for a solid electrolyte fuel cell using methane as a fuel.

As the oxidation catalyst of methane, typically a hexagonal system metal oxides such as $PtCoO_2$, $PdCrO_2$, $PdRhO_2$, $PdCoO_2$, $CuCoO_2$, $CuAlO_2$, $CuGaO_2$ $CuFeO_2$ $CuRhO_2$, $AgCoO_2$, $AgFeO_2$, $AgCrO_2$, $AgRhO_2$, $AgGaO_2$, $AgInO_2$, $AgScO_2$, and $AgTlO_2$ are suitable, in particular, $PdCoO_2$ and $PtCoO_2$ are suitable.

Referring to FIG. 1, an embodiment using the oxidation catalyst of the present invention for a solid electrolyte fuel cell using methane as a fuel will be explained.

The anode 14a of the solid electrolyte element 16A contains metal oxide particles as the oxidation catalyst. The anode 14a is supplied with methane ($CH_4$) gas.

The anode 14a is a two-layer structure comprised of a porous platinum layer 22a formed on one surface of the solid electrolyte substrate 10 and an oxidation catalyst layer 22b formed by carrying metal oxide particles for a methane oxidation catalyst on the outer surface of the porous platinum layer 22a.

The porous platinum layer 22a is formed by coating a platinum paste on one surface of the solid electrolyte substrate 10 comprised of the YSZ fired body, then firing it in the atmosphere.

The oxidation catalyst layer 22b is formed by mixing a predetermined amount of metal oxide particles as a methane oxidation catalyst in an organic binder to make an oxide paste, coating this on the porous platinum layer 22a, then firing it in the atmosphere.

Referring to FIG. 2, another embodiment using the oxidation catalyst of the present invention for a solid electrolyte fuel cell using methane as a fuel will be explained.

The structure of the solid electrolyte fuel cell shown in FIG. 2 is basically similar to the structure shown in FIG. 1. It differs only in the point of the single layer structure of the anode 14b.

The anode 14b is structured with the metal oxide particles 20 dispersed as a methane oxidation catalyst inside the porous platinum layer and present as a large number of dispersed phases. The anode 14b is formed by mixing a predetermined amount of metal oxide particles 20 in a platinum paste to obtain a composite paste, coating this on one surface of a solid electrolyte substrate 10 comprised of a YSZ fired body, then firing this in the atmosphere.

In both the structures of the embodiments of FIG. 1 and FIG. 2, higher oxidation actions were exhibited due to the oxidation catalyst comprised of oxide particles of fine and even size according to the present invention.

Next, the present invention will be explained in further detail by examples.

EXAMPLES

Example 1

<Production of $PdCoO_2$ by Coprecipitation>

A $PdCl_2$ reagent (5.6 mmol) was added to 200 ml of distilled water and stirred to dissolve at 60 to 80° C. for 1 hour and 15 minutes. Next, after the solution temperature dropped to 40 to 50° C., 35% hydrochloric acid (0.03 ml) was added and stirred for 5 to 10 minutes. In this state, it was visually confirmed that the $PdCl_2$ completely dissolved.

CoCl$_2$6H$_2$O (5.6 mmol) was added to the obtained PdCl$_2$ solution and stirred for 15 minutes. Due to this, an equimolar mixed solution of PdCl$_2$ and CoCl$_2$ dissolved together was obtained.

A 0.125M NaOH aqueous solution (100 ml) was added dropwise a bit at a time to this mixed solution over 45 to 60 minutes to obtain a colloidal precipitate. This precipitate was suction filtered using filter paper (made by Toyo Filter Paper, standard 4A) and simultaneously washed by adding 1000 ml of distilled water. Next, the filtered precipitate and the filter paper were dried together in a drier at 70° C. for about 1 hour and 30 minutes.

After drying, an X-ray diffraction pattern of the precipitate confirmed that the precipitate was a mixture of Pd(OH)$_2$ and Co(OH)$_2$.

The dried precipitate was pulverized by a mortar, then sealed in a quartz glass tube and fired at 600° C. and 800° C. for 8 hours.

An X-ray diffraction pattern of the fired body obtained confirmed that the fired body was PdCoO$_2$. The X-ray diffraction pattern of the fired body is shown in FIG. 3.

From measurement of the particle size on a scan electron micrograph, it was learned that the fired body has a mean particle size of about 10 μm.

Conventional Example 1

<Production of PdCoO$_2$ by Double Decomposition>

PdCoO$_2$ was produced based on the method described in R. D. Shannon, D. B. Rogers, and C. T. Prewitt, *Inorganic Chemistry*, Vol. 10, No. 4 (1971), p. 713 to 718.

That is, PdCl$_2$ (0.015 mole) and CoO (0.03 mole) were dry mixed in a Fritsch ball mill at 2400 rpm for 20 minutes, then the mixture was sealed in a transparent quartz tube and heat treated at 700° C. for 8 hours to cause the following double decomposition reaction:

$$PdCl_2 + 2CoO \rightarrow PdCoO_2 + CoCl_2$$

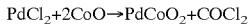

After the heat treatment ended, the product taken out from the transparent quartz tube was lightly pulverized by an agate mortar and pestle.

After pulverization, the CoCl$_2$ included in the product was removed by repeating three or four times a washing operation consisting of adding 100 ml of distilled water to the product and stirring, then allowing this to stand for 1 hour until the supernatant became colorless and transparent.

After washing, the product was dried in the atmosphere at 80° C. for 3 hours.

An X-ray diffraction pattern of the product obtained confirmed that the product was PdCoO$_2$.

From measurement of the particle size on a scan electron micrograph, it was learned that the product has a nonuniform distribution in the range of the particle size of about 10 to 100 μm.

Example 2

The solid electrolyte fuel cell shown in FIG. 2 was fabricated using the PdCoO$_2$ of Example 1 obtained using coprecipitation as an oxidation catalyst.

The solid electrolyte substrate 10 is comprised of a YSZ fired body made from zirconia (YSZ) stabilized by 8 mol % of Y$_2$O$_3$.

The anode 14b has the PdCoO$_2$ particles obtained in Example 1 dispersed in the porous platinum layer as metal oxide particles 20 and present as a large number of dispersed phases. The anode 14b is formed by mixing a predetermined amount of PdCoO$_2$ obtained in Example 1 in a platinum paste to obtain a composite paste, coating this on one surface of a solid electrolyte substrate 10 comprised of a YSZ fired body, then firing this in the atmosphere at 1300° C. for about 1 hour.

At the other surface of the solid electrolyte substrate 10, the cathode 12 is formed by lanthanum strontium manganoxide [(La$_{0.85}$Sr$_{0.15}$)$_{0.90}$MnO$_3$].

Conventional Example 2

In the same way as in Example 2, a solid electrolyte fuel cell shown in FIG. 2 was fabricated. However, the PdCoO$_2$ obtained by double decomposition of Conventional Example 1 was used as the metal oxide particles 20 used as the oxidation catalyst.

Comparative Example

In the same way as in Example 2, a solid electrolyte fuel cell shown in FIG. 2 was fabricated. However, cermet particles comprised of nickel oxide (NiO) and zirconia (YSZ) stabilized by 8 mol % of Y$_2$O$_3$ in a weight ratio of 4:1 (hereinafter referred to as "Ni-cermet") was used as the metal oxide particles 20 used as the oxidation catalyst.

<Measurement of Discharge Characteristics and Generated Power Density>

The cell characteristics of the solid electrolyte fuel cells fabricated in Example 2, Conventional Example 2, and Comparative Example were measured by the measurement device shown in FIG. 4.

The measurement device of FIG. 4 is comprised of a first cylinder 34, made of ceramic sealed at one end and another end by plugs 48a and 48b made of silicone rubber, inserted in a hollow portion 32 of a heating furnace 30 and a second cylinder 36 made of ceramic inserted into the first cylinder 34 through the plug 48a of the one end of the first cylinder 34. The second cylinder 36 is sealed at one end by a plug 50 made of silicone rubber, while is sealed at the other end by an anode 14b of the solid electrolyte element 16B arranged there.

A methane gas supply pipe 38 extends through the plug 48a of the one end of the second cylindrical member 36 up to near the anode 14b and supplies dry methane gas substantially not containing moisture at a predetermined flow rate to the anode 14b. The exhaust pipe 42 is similarly inserted through the plug 48a of the one end of the second cylinder 36 into the second cylinder and exhausts the combustion gas including the combustion gas of methane.

An oxygen supply pipe 40 passes extends through the plug 48b of the other end of the first cylindrical member 34 up to near the cathode 12 of the solid electrolyte element 16B and supplies oxygen at a predetermined flow rate to the cathode 12. The exhaust pipe 44 is similarly inserted through the plug 48b of the other end of the first cylindrical member 34 into the first cylindrical member 34 and exhausts the unused remainder of supplied oxygen.

Further, a thermocouple 46 extends through the plug 48b of the other end of the first cylinder 34 to near the solid electrolyte element 16B and measures the ambient temperature near the solid electrolyte element 16.

Using the above measurement device, the discharge characteristic was measured in the state controlling the furnace 30 so as to obtain a measurement temperature by the thermocouple 46 of 850° C. That is, the output voltage was measured while changing the output current from the cathode 12 and anode 14b of the solid electrolyte element 16B.

Figure 5:
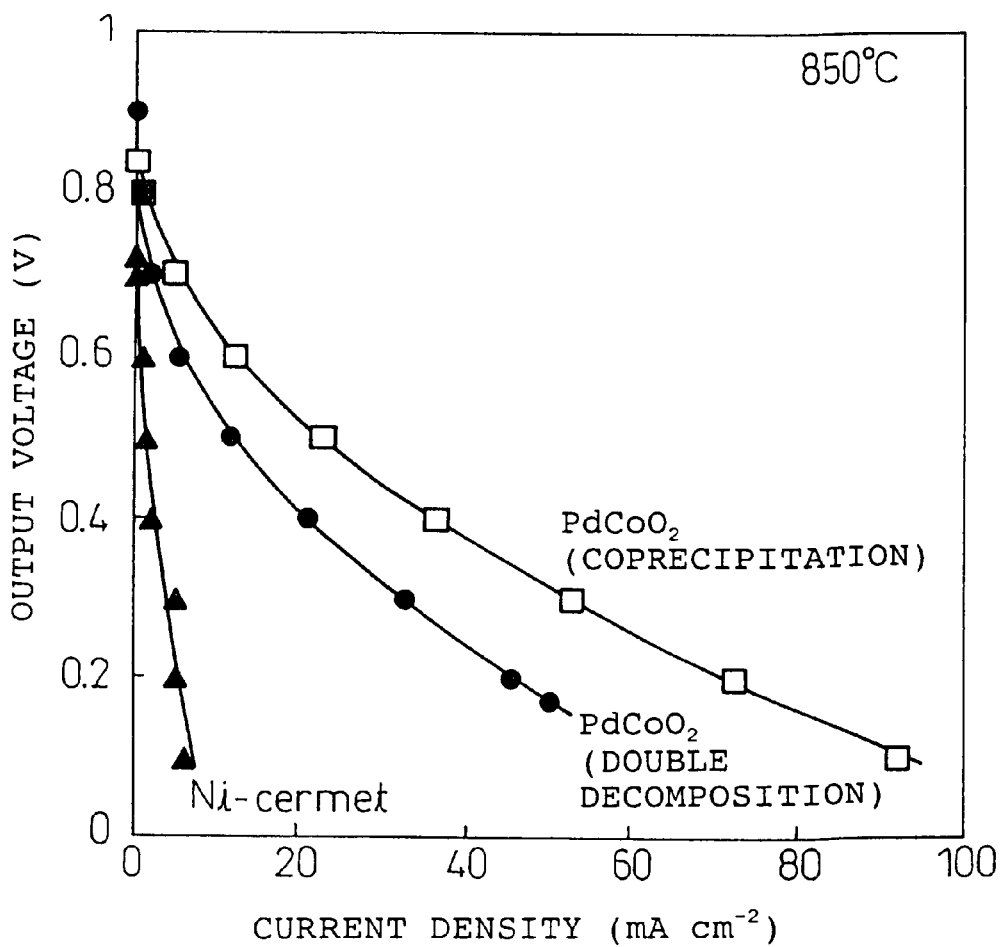
FIG. 5 is a graph showing the discharge characteristic of a solid electrolyte fuel cell using metal oxide particles ($PdCoO_2$) obtained by coprecipitation of the method of the present invention as the oxidation catalyst at the anode of a solid electrolyte element compared with a conventional example and comparative example.

FIG. 5 shows the results of measurement of Example 2, Conventional Example 2, and the Comparative Example as "Coprecipitation", "Double Decomposition", and "Ni-cermet". In FIG. 5, the abscissa shows the current density (amount of output current per unit area of electrode), while the ordinate shows the output voltage.

From FIG. 5, it is learned that the discharge characteristic of the solid electrolyte fuel cell of Example 2 containing the PdCoO$_2$ obtained by coprecipitation is much superior to that of Conventional Example 2 containing PdCoO$_2$ obtained by double decomposition and the Comparative Example containing Ni-cermet.

Figure 6:
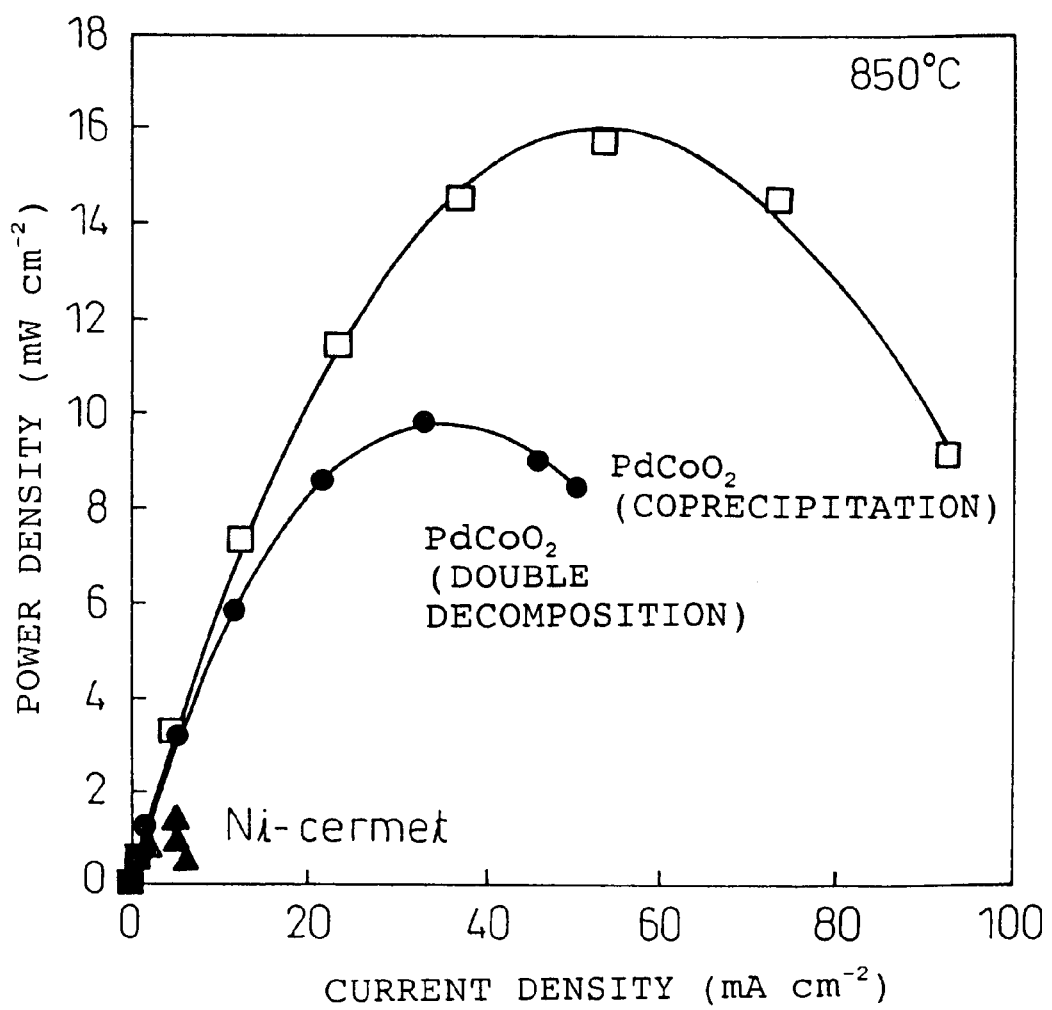
FIG. 6 is a graph showing the generated power density of a solid electrolyte fuel cell using metal oxide particles ($PdCoO_2$) obtained by coprecipitation of the method of the present invention as the oxidation catalyst at the anode of a solid electrolyte element compared with a conventional example and comparative example.

FIG. 6 shows the curves of the generated power density found from the discharge characteristic curves of FIG. 5 similarly as "Coprecipitation", "Double Decomposition", and "Ni-cermet". In FIG. 6, the ordinate shows the power density (voltage x current density), while the abscissa shows the current density. As shown in the figure, the curve of the generated power density bulges upward. The larger the maximum value of the current density generated and the greater the area enclosed by the curve, the larger the amount of power generated.

From FIG. 6, it was learned that the generated power density-of the solid electrolyte fuel cell of Example 2 containing the $PdCoO_2$ obtained by coprecipitation was much larger than Conventional Example 2 containing $PdCoO_2$ obtained by double decomposition and the Comparative Example containing Ni-cermet.

<Measurement of Maximum Current Density>

The maximum current density was measured by changing the ambient temperature of the solid electrolyte element 16B in various ways using the measurement device of FIG. 4 for the various solid electrolyte fuel cells fabricated by Example 2, Conventional Example 2, and the Comparative Example. The "maximum current density" means the current density when the output voltage of the discharge measurement curve shown in FIG. 5 becomes zero and shows the power generating capacity of the solid electrolyte element 16B.

Figure 7:
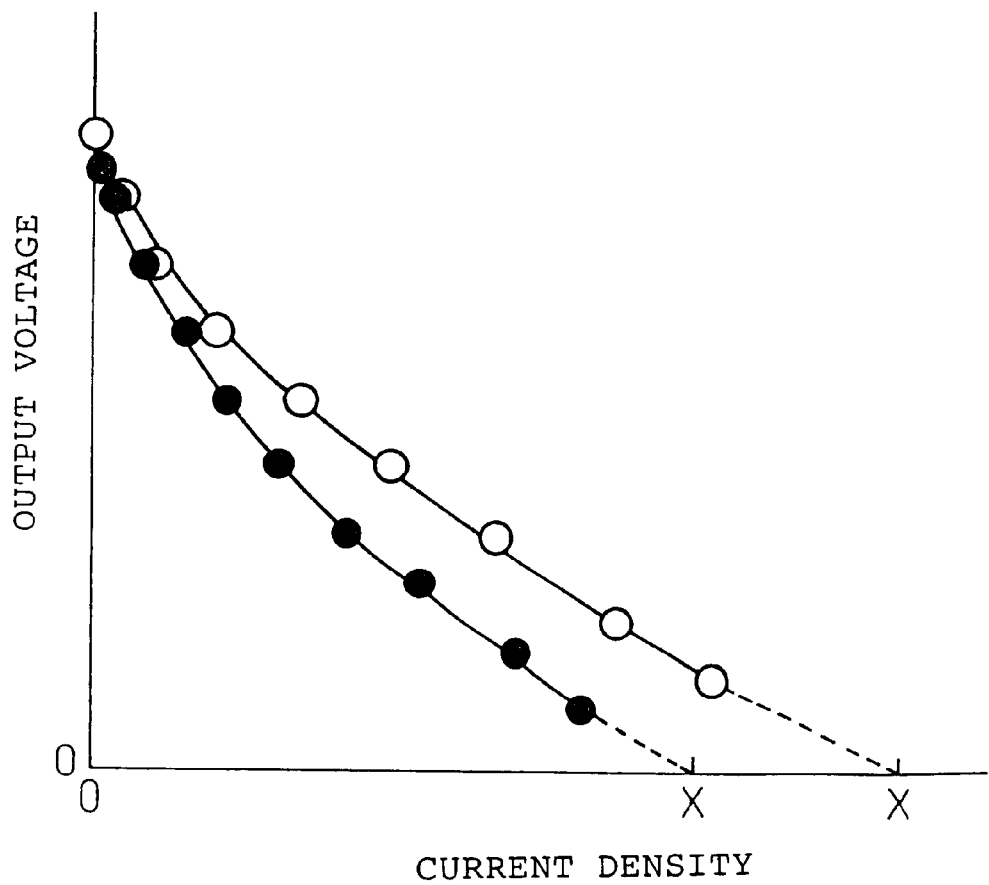
FIG. 7 is a graph for explaining the method of measurement of the maximum current density.

That is, as shown in FIG. 7, the current density of the point X found by changing the amount of current output from the solid electrolyte element 16B, measuring the output voltage, and extrapolating until the voltage taken out became zero volt.

Figure 8:
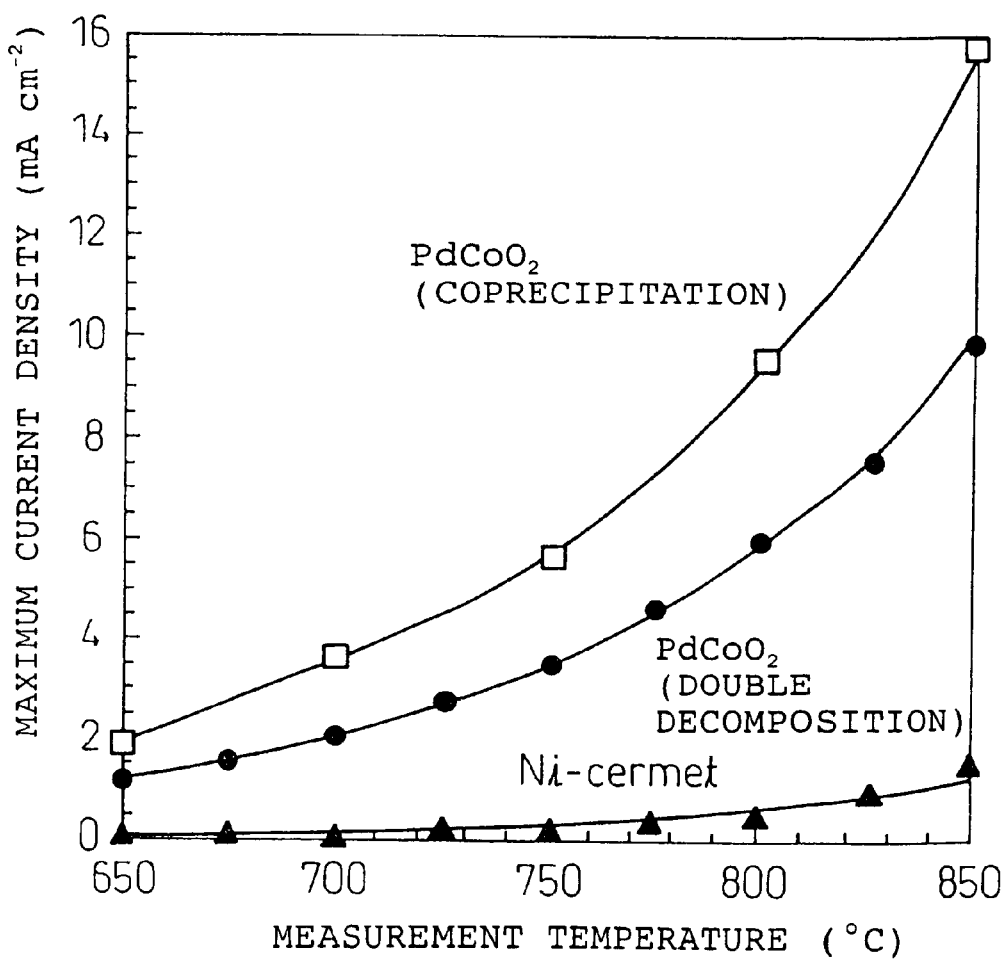
FIG. 8 is a graph showing the maximum current density of a solid electrolyte fuel cell using metal oxide particles ($PdCoO_2$) obtained by coprecipitation of the method of the present invention as the oxidation catalyst at the anode of a solid electrolyte element compared with a conventional example and comparative example.

FIG. 8 shows the relationship between the measurement temperature and maximum current density in the same way as above as "Coprecipitation", "Double Decomposition", and "Ni-cermet" for Example 2, Conventional Example 2, and the Comparative Example.

From FIG. 8, it is learned that the power generating capacity of the solid electrolyte fuel cell of Example 2 containing the $PdCoO_2$ obtained by coprecipitation was much superior to that of Conventional Example 2 containing the $PdCoO_2$ obtained by double decomposition and the Comparative Example containing Ni-cermet.

Example 3

<Production of $PtCoO_2$ by Coprecipitation>

A $PtCl_2$ reagent (1.12 mmol) was added to 400 ml of distilled water and was stirred to dissolve at 60 to 80° C. for 1 hour and 15 minutes. Next, the solution temperature was lowered to 40 to 50° C., then the solution was stirred for 5 to 10 minutes while adding 35% hydrochloric acid 0.06 ml a time by a micropipette. In this state, it was confirmed visually that the $PtCl_2$ was completely dissolved.

$CoCl_2 \cdot 6H_2O$ (1.12 mmol) was added to the obtained $PtCl_2$ solution and the result stirred for 15 minutes. Due to this, an equimolar mixed solution of $PtCl_2$ and $CoCl_2$ dissolved together was obtained.

A 0.125M NaOH aqueous solution (200 ml) was added dropwise a bit at a time to this mixed solution over 45 to 60 minutes to obtain a colloidal precipitate. This precipitate was suction filtered using filter paper (made by Toyo Filter Paper, standard 4A) and simultaneously washed by adding 1000 ml of distilled water. Next, the filtered precipitate and the filter paper were dried together in a drier at 90 to 110° C. for about 1 hour and 30 minutes.

After drying, an X-ray diffraction pattern of the precipitate confirmed that the precipitate was a mixture of $PtCl_2$ and $Co(OH)_2$.

The dried precipitate was pulverized by a mortar, then filled in a platinum tube, sealed in a quartz glass tube and fired at 750° C. for 8 hours. The precipitate was filled in the platinum tube in order to prevent a reaction between the quartz and the powder sample during the heating.

An X-ray diffraction pattern of the fired body obtained confirmed that the fired body was $PtCoO_2$. The X-ray diffraction pattern of the fired body is shown in FIG. 9.

From measurement of the particle size on a scan electron micrograph, it was learned that the fired body had a mean particle size of about 1 µm.

INDUSTRIAL APPLICABILITY

The oxidation catalyst according to the present invention is comprised of metal oxide particles obtained by coprecipitation, so is fine and even in particle size compared with metal oxide particles obtained by the conventional double decomposition or high temperature pressure synthesis.

Therefore, it is possible to exhibit a higher catalytic action than the past and simultaneously possible to achieve a reduction of the cost of manufacture of a catalyst since there is no need for a pulverization process for obtaining finer uniform size particles as in the past.

In particular, the solid electrolyte fuel cell using the oxidation catalyst according to the present invention can obtain a much more superior cell characteristic compared with the past.

What is claimed is:

1. A solid electrolyte fuel cell having an anode including an oxidation catalyst of a gaseous compound comprising a catalyst for promoting an oxidation reaction of a gaseous compound by oxygen ions supplied through a solid electrolyte under an environment where no oxygen molecules are present, wherein the oxidation catalyst comprises a composition of metal oxide particles produced by firing a precipitate comprised of a mixture of two metal hydrates obtained by coprecipitation from a mixed solution of two metal salts of different metal positive ions dissolved together, the composition of said metal oxide particles is expressed by the formula:

$$ABO_2$$

wherein, A is an element selected from the group consisting of Pd, Pt, Cu and Ag;

B is an element selected from the group consisting of Co, Cr, Rh, Al, Ga, Fe, In, Sc, and Tl wherein the fuel cell is comprised of a large number of dispersed layers formed by dispersing said metal oxide particles inside a conductive porous body.

2. A solid electrolyte fuel cell as set forth in claim 1, comprised of a layer formed by carrying said metal oxide particles on the outer surface of a conductive porous body.

3. A solid electrolyte fuel cell as set forth in claims 1, wherein said gaseous compound is methane.

4. A solid electrly fuel cell as set forth in claim 3, wherein said metal oxide particles are $PdCoO_2$ or $PtcoO_2$.

5. A solid electrolyte fuel cell as set forth in claim 1, wherein said metal oxide particles are $PdCoO_2$ or $PtCoO_2$.

* * * * *